Aug. 9, 1932.    B. A. PROCTOR    1,871,233
CARRIER FOR MATERIAL AND APPARATUS FOR USE THEREWITH
Filed Jan. 16, 1929
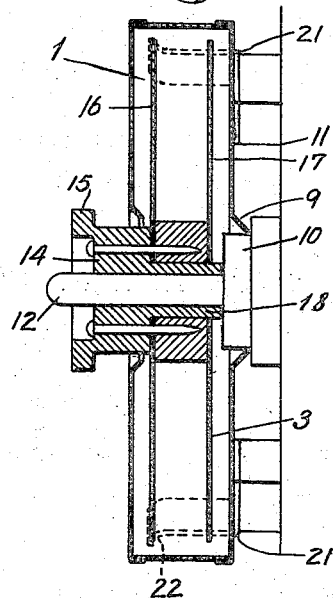
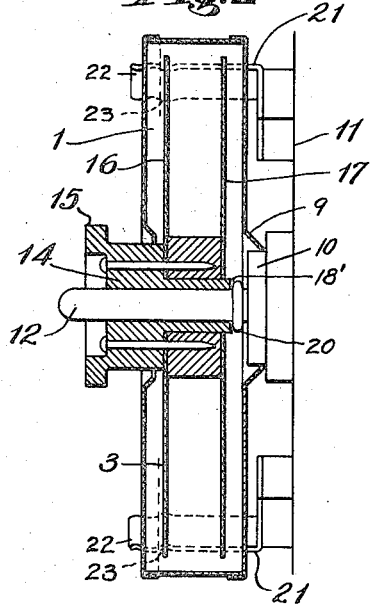
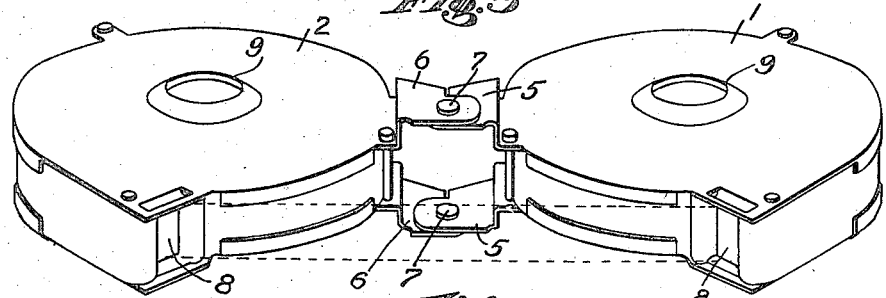
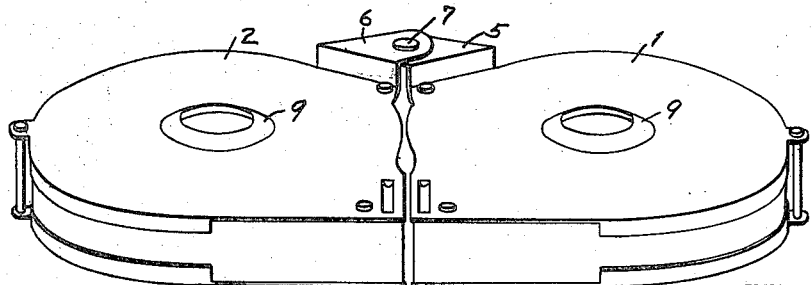
INVENTOR.
BARTON ALLEN PROCTOR
BY
ATTORNEYS.

Patented Aug. 9, 1932

1,871,233

UNITED STATES PATENT OFFICE

BARTON ALLEN PROCTOR, OF PELHAM MANOR, NEW YORK, ASSIGNOR, BY MESNE ASSIGNMENTS, TO KINATOME PATENTS CORPORATION, OF NEW YORK, N. Y., A CORPORATION OF NEW YORK

CARRIER FOR MATERIAL AND APPARATUS FOR USE THEREWITH

Application filed January 16, 1929. Serial No. 332,879.

My invention can be applied broadly to any art in which material is fed from or to a carrier, and is particularly useful in connection with carriers for films, whether for light sensitive material adapted for use with a camera or sound recording apparatus or for image bearing material adapted for use in a motion picture or stereopticon projector, or with a sound reproducing instrument, or with an apparatus adapted for the simultaneous reproduction of visual images and sound.

The present application is a continuation in part of my co-pending application Serial Number 54,910 filed September 8, 1925.

In my apparatus such as that shown and claimed in the above mentioned application, I provide means for automatically threading the film into full operative relation with the film moving mechanism and, if desired, for rewinding the film after the projection or exposure cycle without its removal from the apparatus. In such apparatus, I provide means whereby when the user places the film within the gate by a single movement of the film laterally to its normal direction of movement through the gate, the film will become automatically positioned adjacent the film moving mechanism in such manner that, following the movement of a single control button, the film will be placed in full operative relation with all of the parts of the mechanism necessary for its projection or exposure. In order that there may be a completely automatic operation of the apparatus and the film which is fed therethrough, it is likewise desirable to have the construction of the film holders or containers such that a single lateral movement of the type referred to above will also properly position them and also the reels carried thereby. As will be readily understood by those skilled in the art, such positioning must include the proper locating of the film spool or other appropriate structure contained within the outer protecting casing of the film holder relative to both to the film gate of the apparatus and to the outer protecting casing itself. The above objects are included among those of my invention.

As a matter of convenience, I may prefer to use containers for the film such as those described in my co-pending application Serial Number 332,800 filed concurrently herewith, or any other desired form.

I am aware that means for the independent positioning of the outer protective casing and the inner film spool in a plane normal to the axis thereof have been described and are known. My present invention includes as one of its objects the provision of means for independently and properly positioning and supporting the inner reel and the outer protective casing relatively to such a plane, and axially of the spindle whereby engagement or frictional contact between the respective sides thereof is prevented and whereby the film is fed from said inner reel in proper alignment with the channel of the film gate.

Another object is to provide means of the character described effective by the assembly of the film holder relatively to the film handling apparatus.

Other objects and characteristics are apparent in the following description, the attached drawing and the subjoined claims. Although I am showing one preferred embodiment of my invention, it will be readily understood that I am not limited to this particular construction as changes can readily be made without departing from the spirit of my invention or the scope of my broader claims.

In the drawing:

Figure 1 is a detail sectional view illustrating one form of carrier construction by means of which proper axial positioning of the inner reel and the outer protective casing may be secured, the element for limiting the lateral movement of the inner spool upon the spindle being carried by the film handling apparatus.

Figure 2 is a similar view of a slightly modified construction in which the element limiting the lateral movement of the inner spool is carried upon the spindle.

Figure 3 is a view largely diagrammatic of a film container such as previously described and known adapted for use in accordance with my invention with the means for centering the inner spool axially relatively to the outer protective casing, and upon the supporting spindle of the apparatus, said container being shown with the parts in extending relationship for exhibiting therebetween a length of film in condition for projection or exposure.

Figure 4 shows a container as above with the two parts in closed relationship whereby the film is protected as for storage or shipment.

In carrying out my invention, I may make use of a film container of a single or double type. In either case, I provide a substantially flat cylindrical casing 1 having therein a film spool 3 or other suitable film supporting structure later more fully described.

If I employ a double protective magazine, I may make use of two such casings 1 and 2 each having therein such a film spool 3. Each of such casings may be provided with extensions to the flat sides of the same substantially in the plane of that side as, for example, the plates 5 and 6. The corresponding plates of the two casings may be hinged together as by rivets or other suitable connections 7 so that the two casings can be swung towards or away from one another, this movement taking place about the pivotal axis 7.

The dimensions and positioning of such extensions and of their pivotal connections may be such that the two casings 1 and 2 when swung apart as shown in Figure 3 will occupy the correct relative position for cooperation with the film handling apparatus. Each such casing may be closed on its periphery except for small openings 8 through which the film passes. These openings may be so positioned relatively to the axis of the hinge 7 that when the two casings are closed together with the openings therein opposite each other as shown in Figure 4 the length of film exposed between the containers is reduced and the film protected.

In order to provide for the location and accurate registration of the container in the film handling mechanism with which it is to be used, one of the flat sides of each casing may be formed with an annular projection 9 concentric with the casing and with the spool within it. This projection may be used in cooperation with a suitably shaped boss 10 formed on a side or other support 11 of the apparatus whereon the container is mounted. Any other method of positioning the container upon the apparatus independently of the positioning of the film spool upon the spindle may, however, be employed. The spools within the casings are supported as upon the spindles 12 which project through the said boss 10 from the side 11 of the apparatus and engage the axial openings of the hubs 14 of the spools. The holes in the side walls of the two casings may be made large enough to permit clearance between them and the hubs 14, so that friction which would arise from any rubbing of the hubs 14 on the side walls of the holder will be avoided.

For use within each casing of either the single or double type, I may construct a spool or reel 3, as is clearly shown in Figures 1 and 2 of the drawing, with a central hub 14 which extends outwardly and beyond the side of the casing of the container 1. The left portion of this extension as viewed in Figures 1 or 2 of the drawing, I may provide with an enlargement 15 which forms a convenient handle or knob whereby the user may move the inner reel relatively to the outer casing. Supported by the hub substantially at right angles thereto are the flat reel sides 16 and 17 in spaced parallelism to each other. I may construct the hub 14 and the handle 15 of one piece of metal, which may be formed on a lathe or a screw machine, or otherwise, or I may form a handle and the central core in such manner and force it within a wooden disc with an axial opening therein and attach it thereto as by screws, or by other means. Under some conditions it is desirable to form this element of brass, which is well suited for cooperation with the steel spindle 12 of the apparatus.

I may form the hub with an extension 18, upon the side other than that provided with the knob 15, which projects to the right as viewed in Figure 1 beyond the side 17 of the reel, or with an extension 18' of the character shown in Figure 2.

As is clearly shown in Figure 1, the spindle 12, journalled for rotation in the wall 11 of the film handling apparatus, may extend through a forwardly facing boss 10 against which the surface of the extension 18 on hub 14 abuts when the hub is moved to the right as viewed in Figure 1 of the drawing into assembled relation with the spindle. It will readily be seen that this boss 10 will co-act with such surface of the extension 18 to limit the lateral movement of the film spool and to hold the side 17 well separated from the casing side and hence position the film in proper lateral relation with the openings 8 of the containers.

In a preferred modification shown in Figure 2, I may construct the spindle 12 with an enlargement or stop 20 which co-acts with the extension 18' to prevent undue lateral movement of the inner reel relative to the outer container. According to such construction since the stop 20 revolves with the abutting surface of the extension 18', rotational friction between the reel and the apparatus is obviated. Under certain conditions, I find it desirable to construct the spindle 12 with a positioning element of the sort described and claimed in the co-pending application of Warren Dunham Foster and Clarkson Ullysses Bundick, Serial Number 170,181 filed February 23, 1927, or in the co-pending application of Edith Dunham Foster, said Bundick and myself, Serial Number 332,882, filed concurrently herewith.

To support the casing upon the apparatus, independently of the means employed to support the inner film reel, I may provide flat springs 21 which project outwardly as from the wall 11 of the apparatus, the extremities 22 of these springs being bent slightly outwardly away from each other to facilitate the introduction of the sides of the casing therebetween and at another point, as indicated at 23 in Figure 2, slightly inwardly toward each other to facilitate the retention of the casing against accidental movement, this construction being such as is disclosed and claimed in the co-pending application of Warren Dunham Foster, Serial Number 332,840, filed concurrently herewith.

As will be readily understood by those skilled in the art, the above described construction makes possible the correct axial positioning and supporting of the film spool relative to the casing and of the casing relative to the film handling apparatus by one movement of the hands of the operator as he places the container into operative position upon the apparatus, the casing or casings being supported independently of the reel. If the container is of the type consisting of two hinged casings, the user swings the casings apart on their hinges, grasping each of the casings with the fingers of one hand. He then moves the casings toward the apparatus, introducing the spindles into the axial openings of the outer casing and the inner spool. As he pushes the container onto the apparatus, the positioning projections 9 and 18 of the casings and reels, respectively, engage with the forwardly facing boss 10 of the apparatus, or the surface of extension 18' with the stop 20, if the construction is that shown in Figure 2 of the drawing. At the conclusion of the lateral movement, this co-action results in the proper positioning and supporting of the containers and reels relative to the apparatus and to each other. It will be readily understood that as he moves the film container inwardly, the user may press against both the casing proper and against the handles or knobs 15 of the inner film spool which project through and beyond the sides of the casings. Such movement urges the springs 21 slightly apart, until the container passes beyond the bent portions 22. Then the springs move toward each other for firmly supporting the containers in their proper positions.

The assembly of a container, of the single type, constructed according to my invention, corresponds to the process described above.

Certain advantages of my invention are evident from the foregoing portion of this specification.

Other advantages include the provision of simple and inexpensive means whereby the user with one lateral movement may correctly axially position and support both the film reel and the casing relative to the film handling apparatus and to each other. Such a single movement not only properly positions a reel and casing in a plane substantially normal to the supporting axis, but also properly positions both the reel and its casings relatively to such plane.

I claim:

1. In a film holder, a casing and a film spool positioned therewithin and movable relatively thereto, said film spool including a handle extending through and beyond a wall of said casing, said handle including an inner section materially smaller than the opening in said casing through which it extends and an outer section materially larger than said opening.

2. In a film handling apparatus, a spindle adapted to support a film spool and a film container, said film container comprising a casing and a film spool positioned therewithin and movable relatively thereto, and said film spool including a handle extending through a wall of said casing whereby said spool may be moved along said spindle.

3. In a film handling apparatus, a spindle adapted to support a film spool, a film container, said film container comprising a casing and a film spool positioned therewithin and movable relatively thereto, said film spool including a handle extending through a wall of said casing whereby said spool may be moved along said spindle, and mechanism adapted to position said casing upon said apparatus out of engagement with said film spool.

4. In a film handling apparatus, a spindle adapted to support a film spool, a film container, said film container comprising a casing and a film spool positioned therewithin and movable relatively thereto, said film spool including a hub, said container and said hub having aligning openings for the reception of said spindle, and a handle attached to said hub and extending through a wall of said casing whereby said spool may be moved in a direction parallel to the axis of said spindle, and mechanism adapted to support said casing upon said apparatus out of engagement with said film spool and said spindle.

5. In a film handling apparatus, a spindle adapted to support a film spool, a film container, said film container comprising a casing and a film spool positioned therewithin and movable relatively thereto, said film spool including a handle extending through a wall of said casing whereby said spool may be moved along said spindle, and mechanism adapted to position said casing upon said apparatus out of engagement with said spindle.

6. In a film handling apparatus, a spindle adapted to support a film spool, a film container, said film container comprising a casing and a film spool positioned therewithin and movable relatively thereto, said film spool including a handle extending through a wall of said casing whereby said spool may be moved in a direction parallel to the axis of said spindle, and mechanism adapted to support said casing upon said apparatus out of engagement with said spindle.

7. In a film handling apparatus, a spindle adapted to support a film spool, a film container comprising a casing, a film spool movable therewithin and relatively thereto, said casing and said spool having aligning openings for the reception of said spindle, and means operable from the exterior of said casing whereby said spool may be moved laterally upon said spindle.

8. In a film handling apparatus, a spindle adapted to support a film spool, a film container, said film container comprising a casing and a film spool positioned therewithin and movable relatively thereto, said film spool including a handle extending through and beyond a wall of said casing whereby said spool may be moved along the axis of said spindle, and means to limit such movement.

9. In a film handling apparatus, a spindle adapted to support a film spool, a film container, said film container comprising a casing and a film spool positioned therewithin and movable relatively thereto, said film spool including a handle attached to one side thereof and extending through and beyond a wall of said casing whereby said spool may be moved along the axis of said spindle, and means to limit such movement, said means comprising a stop revoluble with said spindle and so disposed thereon as to engage said spool upon the side thereof opposite that to which said handle is attached.

10. In a film handling apparatus, a spindle adapted to support a film spool, a film container, said film container comprising a casing and a film spool positioned therewithin and movable relatively thereto, said spool comprising a hub, two side plates supported thereby in spaced parallelism thereto, a first extension from said hub projecting from one of said side plates at substantially a right angle thereto in a direction away from the other of said side plates through an opening in said container to a position therewithout whereby said spool may be moved along the axis of said spindle, said container being supplied with such an opening and said container and said hub being provided with aligning openings for the reception of said spindle, a second extension from said hub projecting from the second mentioned of said side plates at substantially a right angle thereto in a direction opposite that in which said first mentioned extension projects, and a stop formation disposed upon said apparatus and adapted to cooperate with said second mentioned extension to limit such movement of said spool along the axis of said spindle.

11. A film handling apparatus including a film container, said film container comprising a casing and a spool positioned therewithin and movable relative thereto, and mechanism necessarily effective upon the movement of said casing and said spool into assembled relation with said apparatus for laterally positioning said spool relative to said casing.

12. In a film handling apparatus, a supporting spindle, a film container, said film container comprising a casing and a film spool positioned therein and movable relatively thereto, said casing including substantially parallel side walls, said film spool including a hub, said hub supporting side walls normal to the axis thereof, said casing and said hub including coaxial openings for the reception of said supporting spindle whereby said hub is supported, and positioning mechanism necessarily effective upon the movement of said casing and said film spool into assembled relation with said apparatus for positioning said side walls supported by said hub in spaced relation to said side walls of said casing.

13. In a film handling apparatus, a spindle adapted to support a film spool, a film container comprising a casing, a film spool movable therewithin and relatively thereto, said casing and said spool having aligning openings for the reception of said spindle, and mechanism necessarily effective upon the movement of said casing and said film spool into assembled relation with said apparatus for positioning said spool upon said spindle in spaced lateral relation to said casing.

14. In a film handling apparatus, a spindle adapted to support a film spool, a film container comprising a casing, a film spool movable therewithin and relatively thereto, said casing and said spool having aligning openings for the reception of said spindle, and mechanism necessarily effective upon the movement of said casing and said film spool into assembled relation with said apparatus for positioning said spool and said casing in spaced lateral and axial relation to each other.

15. In a film handling apparatus, a spindle adapted to support a film spool, a film container comprising a casing, a film spool movable therewithin and relatively thereto, said casing and said spool having aligning openings for the reception of said spindle, and mechanism necessarily effective upon the movement of said casing and said film spool into assembled relation with said apparatus for positioning said spool laterally upon said spindle and for supporting said casing independently of said spool.

16. Film handling apparatus including a film container comprising a casing and a film spool positioned therewithin and movable relatively thereto, mechanism upon said apparatus adapted to support said spool, mechanism upon said apparatus adapted to support said casing, and positioning means adapted to guide said casing and said film spool into operative relation with the respective supporting mechanisms therefor and to assure that each of the same will be laterally spaced in relation to the other following a single bodily movement of said casing and said spool.

17. Film handling apparatus including a film container comprising a casing and a film spool positioned therewithin and movable relatively thereto, a spindle adapted to support said spool, mechanism adapted to support said casing, and means adapted to position said casing in operative relation to said mechanism and said film spool in a predetermined position upon said spindle by a single bodily movement of both said casing and said spool.

Signed at New York city, in the county of New York and State of New York, this 28th day of December, A. D. 1928.

BARTON ALLEN PROCTOR.